Nov. 21, 1933.    W. A. KNOX    1,935,881
WINDSHIELD WIPER
Filed Dec. 1, 1930
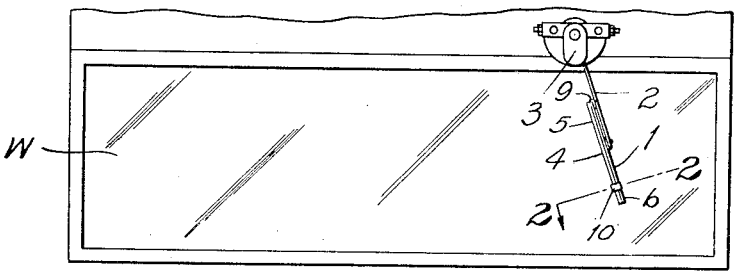
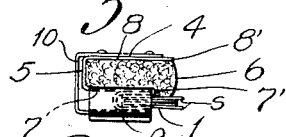
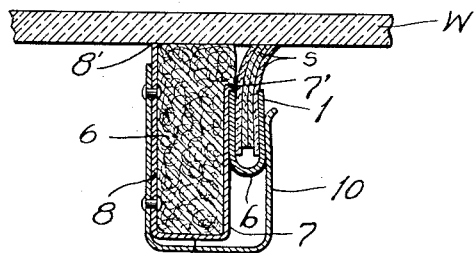
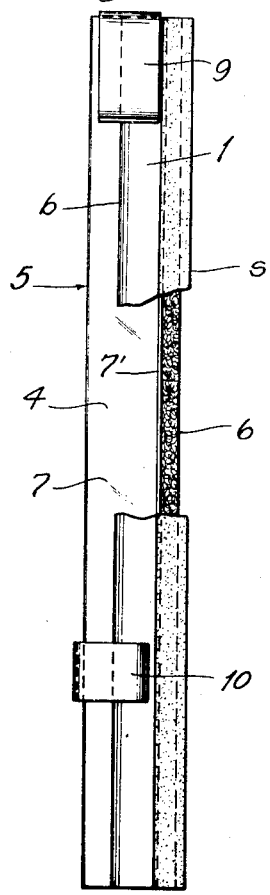
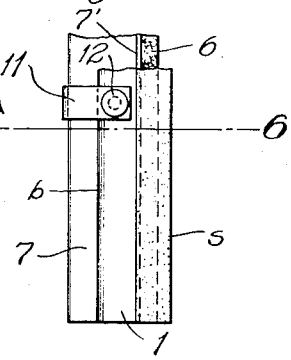
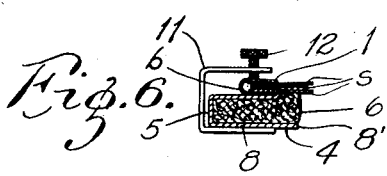
INVENTOR:
WILLIAM A. KNOX.
By Harry A. Benner
ATTORNEY Patented Nov. 21, 1933

1,935,881

UNITED STATES PATENT OFFICE 1,935,881

WINDSHIELD WIPER

William A. Knox, St. Louis, Mo., assignor of one-half to William G. Fendler, St. Louis, Mo.

Application December 1, 1930. Serial No. 499,216

1 Claim. (Cl. 15—250)

My invention has relation to improvements in windshield wipers for motor vehicles and consists in the novel features of construction more fully set forth in the specification and pointed out in the claim. My improved device is primarily adapted to be an attachment for the wiper element of the conventional type of windshield wiper so that it may be effective in preventing the accumulation of sleet or ice on the windshield which the wiper, as commonly constructed, is unable to cope with.

The principal object of the invention is therefore to provide a windshield wiping element capable of holding a suitable chemical, such as glycerin, and spreading this chemical over the windshield with each movement of the wiper. It is a further object of the invention to provide such a wiping element that may be readily attached to the permanent wiping element when required by the weather conditions. A further object is to provide a wiping element for applying a suitable chemical to the windshield to prevent the formation of ice thereon and at the same time embodying means for scraping the slush from the windshield. In addition to the above objects, my improved wiper has other advantages, including simplicity and durability, as will be more fully apparent from a detailed description of the invention in connection with the accompanying drawing in which—

Figure 1 is a front view of a windshield showing my invention applied thereto; Fig. 2 is an enlarged cross-sectional detail taken on the line 2—2 of Fig 1; Fig. 3 is an end view of my improved wiper attached to a wiper of the conventional type; Fig. 4 is a side elevation thereof with part of the conventional wiper broken away; Fig. 5 is a side elevation of a fragment of a wiper showing a modification of the means for fastening my improved wiper to the conventional wiper; and Fig. 6 is a cross-sectional detail taken on the line 6—6 of Fig. 5.

Referring to the drawing, W represents the windshield of a motor vehicle having a conventional moisture removing windshield wiper 1 applied thereto, said wiper 1 being attached to an oscillating lever arm 2 projecting from the wiper head 3 as is well understood in the art. Obviously, the motive power of the wiper may be electrical or pneumatic according to standard practice, and has no particular bearing on the subject of the present application which is confined to a specific form of wiper 4 attached to the conventional type of wiper 1. The wiping strips s of the wiper 1 are crimped within the metallic body b of said wiper, said body b also serving to carry my improved wiper 4 as an attachment when the same is needed as will be apparent from the following description:

A U-shaped metallic holder 5 is provided of substantially the same length as the standard wiper 1 in which is securely crimped a strip of belt 6 or equivalent absorbent material capable of holding a substantial amount of glycerin or other suitable chemical having anti-freeze properties. The side 7 of the holder 5 is adapted to come adjacent to body b of the wiper 1 and is provided with a narrow flange 7' along its upper edge to serve as an abutment against which the body b of the wiper bears. The opposite side 8 of the holder 5 extends beyond the side 7 so that its edge 8' will operate in close proximity to the surface of the windshield W and serve as a scraper to remove accumulations of slush therefrom. The felt strip 6 of course, bears against the windshield in order that it may rub the chemical thereon as the wiper oscillates. Two clips 9 and 10 are provided for gripping the wiper 1 and holding the wiper 4 securely thereto, the former being integral with the side 7 of holder 5 and depending downwardly from the top edge thereof. The clip 10 is riveted (soldered or welded) to the side 8 of holder 5 and is bent U-shaped so as to envelope the holder 5 and wiper 1 which it firmly grips (Fig. 2). It is apparent that the clips 9 and 10 together with the flange 7' hold the wiper element 4 in secure relation with the wiper 1 so that as the latter is caused to oscillate over the windshield W, the wiper element 4 will move with it as a unit. As the element 4 travels back and forth over the windshield, the chemical will be rubbed on the glass to prevent freezing of the moisture thereon, and the scraping edge 8' will remove the slush accumulations that would otherwise interfere with the operations of the wiper.

In Figs. 5 and 6 I show a modification of the wiper 4 wherein a bracket 11 and set screw 12 replace the clip 10 for securely attaching the wiper element 4 to the body b of the wiper 1.

Having described my invention, I claim:

An attachment for a windshield wiper comprising a wiping element including a holder, a liquid absorbent material therein, a spring clip depending downwardly from the top edge of the holder to engage the wiper, and a second spring clip spaced from the first and projecting from the side of the holder to engage the wiper.

WILLIAM A. KNOX.